(12) United States Patent
Filipovic

(10) Patent No.: US 8,000,302 B2
(45) Date of Patent: Aug. 16, 2011

(54) ADAPTIVE MULTI-CHANNEL MODEM

(75) Inventor: Daniel F. Filipovic, Solana Beach, CA (US)

(73) Assignee: QUALCOMM Incorporated, San DIego, CA (US)

( * ) Notice: Subject to any disclaimer, the term of this patent is extended or adjusted under 35 U.S.C. 154(b) by 1401 days.

(21) Appl. No.: 11/165,760

(22) Filed: Jun. 23, 2005

(65) Prior Publication Data

US 2006/0291428 A1    Dec. 28, 2006

(51) Int. Cl.
*H04B 7/216* (2006.01)
(52) U.S. Cl. ....................................................... 370/335
(58) Field of Classification Search .................. 370/335, 370/343, 350, 315, 328, 317, 320; 455/558, 455/552, 553, 426, 304, 83, 67.1, 446, 24, 455/63, 306, 501, 503, 42, 63.1, 65, 432.2, 455/432.3, 435.3, 442, 447, 451, 452.1, 452.2, 455/464
See application file for complete search history.

(56) References Cited

U.S. PATENT DOCUMENTS

| | | | |
|---|---|---|---|
| 5,694,414 A | 12/1997 | Smith et al. | |
| 5,920,590 A * | 7/1999 | Lomp | 375/146 |
| 6,122,309 A * | 9/2000 | Bergstrom et al. | 375/130 |
| 6,415,159 B1 * | 7/2002 | Miyashita | 455/558 |
| 6,456,850 B1 * | 9/2002 | Kim et al. | 455/453 |
| 6,584,081 B1 * | 6/2003 | Lee et al. | 370/315 |
| 6,584,304 B1 * | 6/2003 | Thomsen et al. | 455/188.1 |
| 7,230,711 B1 * | 6/2007 | Hovde | 356/432 |
| 2003/0118081 A1 * | 6/2003 | Philips et al. | 375/130 |
| 2003/0133423 A1 * | 7/2003 | LaDue | 370/330 |
| 2004/0160926 A1 * | 8/2004 | Schilling | 370/335 |
| 2005/0084031 A1 * | 4/2005 | Rosen et al. | 375/295 |
| 2005/0100076 A1 * | 5/2005 | Gazdzinski et al. | 375/130 |
| 2006/0240769 A1 * | 10/2006 | Proctor, Jr. et al. | 455/24 |

FOREIGN PATENT DOCUMENTS

| | | |
|---|---|---|
| CN | 1483245 A | 3/2004 |
| EP | 0856745 | 8/1998 |
| JP | 09083389 | 3/1997 |
| JP | 10290212 | 10/1998 |
| JP | 11017644 | 1/1999 |
| JP | 2000013262 | 1/2000 |
| JP | 2002539708 | 11/2002 |

(Continued)

OTHER PUBLICATIONS

XP010701607, KR, Won-Cheol Lee et al.

(Continued)

*Primary Examiner* — Melody Mehrpour
(74) *Attorney, Agent, or Firm* — Howard Seo

(57) ABSTRACT

An adaptive multi-channel (AMC) modem that can receive one or multiple spread spectrum signals simultaneously includes an adjustable filter, a $\Delta\Sigma$ ADC, and a digital processor. The adjustable filter filters an input signal with an adjustable bandwidth and provides an output signal comprised of a selected number of spread spectrum signals. The $\Delta\Sigma$ ADC digitizes the output signal and provides data samples. The sampling rate and/or the reference voltage of the $\Delta\Sigma$ ADC may be varied to obtain the desired performance. The digital processor processes the data samples for each spread spectrum signal to recover data sent in that signal. A controller ascertains the operating conditions (e.g., the desired signal level, the undesired signal level, and so on) and selects the number of spread spectrum signals to receive based on the operating conditions, user requirements, and possibly other factors.

36 Claims, 10 Drawing Sheets

FOREIGN PATENT DOCUMENTS

| | | |
|---|---|---|
| JP | 2005509352 | 4/2005 |
| JP | 2005529544 | 9/2005 |
| JP | 2006503452 | 1/2006 |
| JP | 2007500489 | 1/2007 |
| KR | 199832721 | 7/1998 |
| KR | 200558789 | 6/2005 |
| WO | WO9930428 | 6/1999 |
| WO | WO03105390 | 12/2003 |

OTHER PUBLICATIONS

International Search Report—PCT/US06/024499, International Searching Authority—European Patent Office, Jan. 3, 2007.

Written Opinion—PCT/US06/024499, International Searching Authority—European Patent Office, Jan. 3, 2007.

SDR-based Digital IF for Multi-Band W-CDMA Transceiver (Dec. 18, 2003) : http://ieeexplore.ieee.org/stamp/stamp.jsp?arnumber=01292764.

* cited by examiner

ADAPTIVE MULTI-CHANNEL MODEM

BACKGROUND

I. Field

The present invention relates generally to communication, and more specifically to a modulator/demodulator (modem) for a communication system.

II. Background

In a wireless communication system, a transmitter processes data to generate a radio frequency (RF) modulated signal and transmits the RF modulated signal on a frequency channel via a wireless communication link to a receiver. The transmitted signal is distorted by the wireless link (e.g., fading and multipath), corrupted by noise, and further degraded by interference from other transmitters transmitting on or near the same frequency channel. The receiver receives the transmitted signal, processes the received signal, and attempts to recover the data sent by the transmitter. The distortion due to the wireless link, the noise, and the interference all hinder the receiver's ability to recover the transmitted data.

The receiver is typically designed such that it can meet various system requirements under the worst case operating conditions. This typically entails designing filters and other circuit blocks such that the desired performance can be achieved even if the RF modulated signal is received at the lowest specified level and the interfering signal is at the highest specified level. This conventional receiver design has certain key limitations, as described below.

SUMMARY

An adaptive multi-channel (AMC) modem that can receive one or multiple spread spectrum signals simultaneously in many operating environments is described herein. In an embodiment, the AMC modem includes an adjustable filter, a delta-sigma analog-to-digital converter ($\Delta\Sigma$ ADC), and a digital processor. The adjustable filter filters an input signal with an adjustable bandwidth and provides an output signal comprised of a selected number of spread spectrum signals. The adjustable filter may be an adjustable baseband filter having one or few poles that can be moved to obtain the desired bandwidth. The $\Delta\Sigma$ ADC digitizes the output signal and provides data samples. The $\Delta\Sigma$ ADC has sufficient dynamic range for the spread spectrum signals being received. The sampling rate and/or the reference voltage of the $\Delta\Sigma$ ADC may be varied to obtain the desired performance. The digital processor processes the data samples for each spread spectrum signal to recover data sent in that signal. The digital processor may include a channel processor for each spread spectrum signal being received. Each channel processor may include (1) a rotator that frequency translates the assigned spread spectrum signal down to direct current (DC) and (2) a digital filter that filters out undesired signals and performs equalization to compensate for the frequency responses of other circuit blocks (e.g., the adjustable filter) in the receive path.

A controller ascertains the operating conditions (e.g., the desired signal level, the undesired signal level, and so on) and selects a particular number of spread spectrum signals to receive based on the operating conditions, user requirements, and possibly other factors. The controller may select multiple spread spectrum signals for different services (e.g., voice, packet data, media broadcast, and so on) and may change the number of spread spectrum signals to receive based on changes in the operating conditions, user requirements, and so on.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The AMC modem described herein may be used for various wireless communication systems such as a code division multiple access (CDMA) system, a time division multiple access (TDMA) system, a frequency division multiple access (FDMA) system, an orthogonal frequency division multiple access (OFDMA) system, and so on. A CDMA system may implement one or more radio access technologies such as cdma2000, Wideband-CDMA (W-CDMA), and so on. cdma2000 covers IS-95, IS-2000, and IS-856 standards. A TDMA system may implement Global System for Mobile Communications (GSM). GSM and W-CDMA are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. For clarity, the AMC modem is specifically described below for cdma2000, which is simply called "CDMA".

Figure 1:
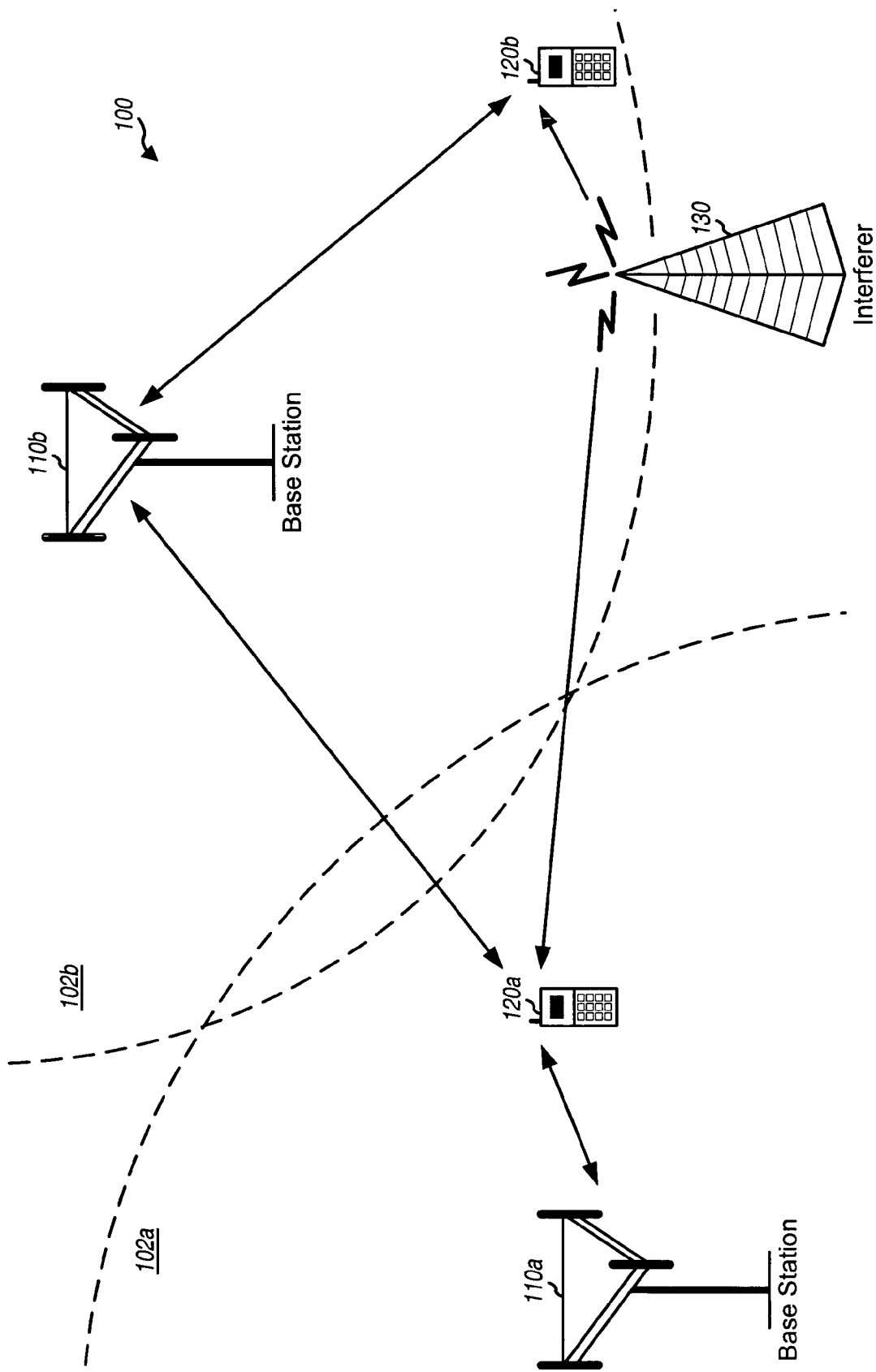
FIG. 1 shows a system with multiple base stations and wireless devices.

FIG. 1 shows a CDMA system 100 with multiple base stations and multiple wireless devices. For simplicity, only two base stations 110a and 110b and two wireless devices 120a and 120b are shown in FIG. 1. A base station is generally a fixed station that communicates with the wireless devices and may also be called a Node B, an access point, or some other terminology. Each base station 110 provides communication coverage for a particular geographic area 102.

A wireless device may be fixed or mobile and may also be called a mobile station, a user equipment, a terminal, a subscriber unit, or some other terminology. Each wireless device may communicate with zero, one, or multiple base stations on the forward link and/or reverse link at any given moment. The forward link (or downlink) refers to the communication link from the base stations to the wireless devices, and the reverse link (or uplink) refers to the communication link from the wireless devices to the base stations. A base station with which a wireless device communicates is called a serving base station.

FIG. 1 also shows an interferer 130 that is not a part of CDMA system 100 and transmits a signal that acts as interference to wireless devices 120. The interfering signal from interferer 130 may be close in frequency to the desired signals transmitted by base stations 110. The interfering signal may also be received by wireless devices 120 at a high power level.

The wireless devices may be distributed throughout the coverage areas of the base stations. Furthermore, the wireless devices may be located at different distances to the interferer. For the example shown in FIG. 1, wireless device 120a is located near base station 110a and far from interferer 130. The path loss between a transmitter and a receiver for a line-of-sight transmission is roughly proportional to the $4^{th}$ law of the distance between the transmitter and the receiver, or path loss $\propto$ (distance)$^4$. Thus, wireless device 120a may receive the desired signal from base station 110a at a high power level and the interfering signal from interferer 130 at a relatively low power level. In contrast, wireless device 120b is located near the coverage boundary of base station 110b and close to interferer 130. Thus, wireless device 120b may receive the desired signal from base station 110b at a low power level and the interfering signal from interferer 130 at a high power level.

Figure 2A:
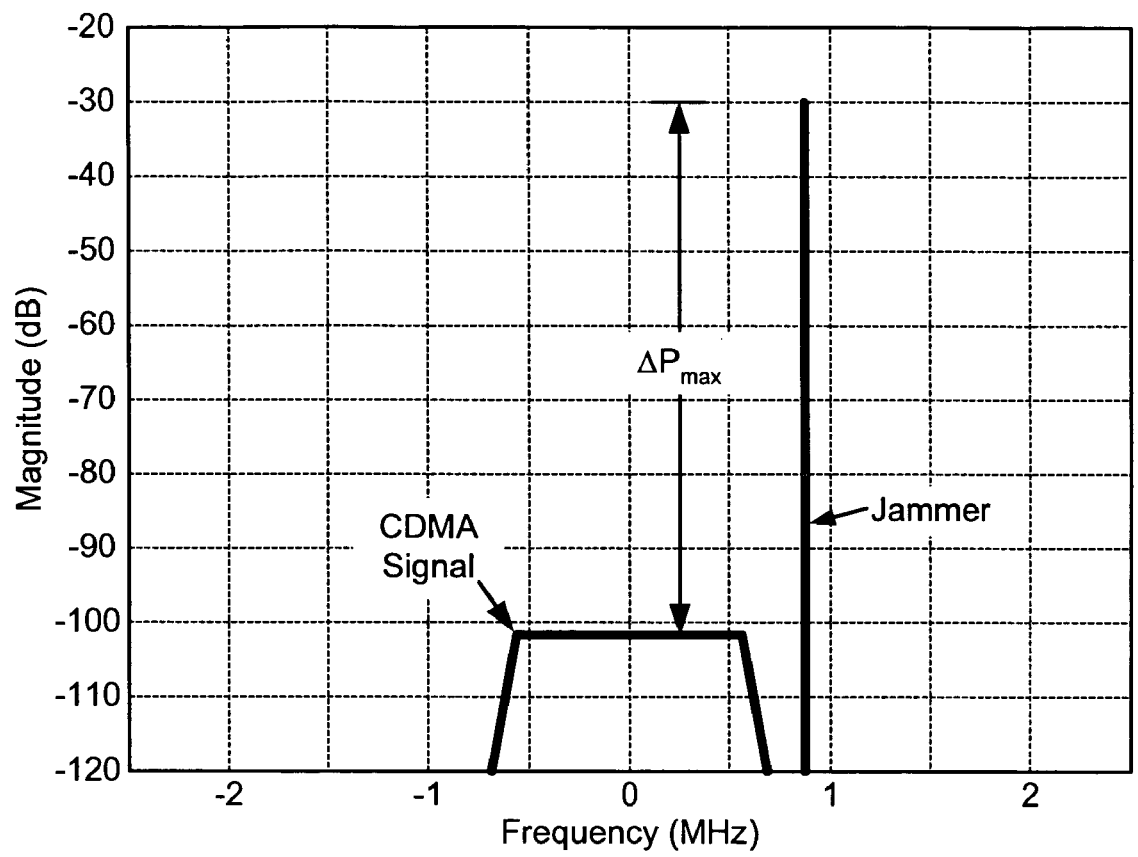
FIG. 2A shows a plot of a CDMA signal for a single-tone test in IS-98D.

FIG. 2A shows a plot of a CDMA signal from a base station for a single-tone test specified by IS-98D, which is applicable to cdma2000. The CDMA signal has a bandwidth of 1.23 MHz and is shown centered at 0 Hz or DC in FIG. 2A. For the single-tone test, a single tone located at +900 KHz from the center frequency of the CDMA signal is 71 decibels (dB) higher in amplitude than the CDMA signal level. The single tone models a large amplitude interfering signal, which is often called a "jammer". For the single-tone test, the CDMA signal is at −101 dBm and the single tone is at −30 dBm. IS-98D also specifies a two-tone test in which two tones located at +900 KHz and +1700 KHz from the center frequency of the CDMA signal are 58 dB higher in amplitude than the CDMA signal level.

The single-tone and two-tone tests are intended to test the linearity and dynamic range of the receive path in a wireless device. To meet these tests, the analog and digital filters in the wireless device are often designed with a bandwidth for one CDMA signal and to have high selectivity (or a sharp roll-off) in order to sufficiently reject a large amplitude jammer. The circuit blocks in the receive path are also designed to provide the desired performance even if the received CDMA signal is at sensitivity. Sensitivity refers to the lowest CDMA signal level that the wireless device is required to correctly demodulate. The amount of rejection required at a specified frequency offset is determined by a jammer-to-signal ratio, which is the ratio of the jammer level to the desired signal level and is denoted as $\Delta P$. For the IS-98D single-tone test, the jammer-to-signal ratio is $\Delta P_{max}$=71 dB at 900 KHz.

Each base station in the CDMA system may transmit multiple CDMA signals at approximately the same power level on multiple CDMA channels that are adjacent to one another, or side-by-side. A CDMA channel is a frequency channel for one CDMA signal and is approximately 1.23 MHz wide. The multiple CDMA signals may be for different services such as voice, packet data, media broadcast, text messaging, and so on. Conventionally, a wireless device selects one CDMA signal on one CDMA channel and processes the selected CDMA signal to obtain a desired service.

It may be desirable for a wireless device to receive multiple CDMA signals simultaneously, e.g., to concurrently obtain different services such as voice and packet data. An analog filter with an expanded bandwidth may be used to receive multiple CDMA signals. The ratio of the transition band to the passband determines the roll-off requirement for the analog filter. If the transition band is fixed (to attenuate high amplitude jammers under the worst case operating conditions) and the passband is increased to pass more CDMA signals, then the ratio of the transition band to passband decreases. An analog filter with a very sharp roll-off is needed to sufficiently attenuate the large amplitude jammers. Such an analog filter would likely be costly and power hungry.

An AMC modem can receive one or multiple CDMA signals simultaneously in many operating environments. The AMC modem utilizes circuit blocks that are both power efficient and cost effective to receive one or multiple CDMA signals depending on the operating conditions. Operating conditions refer to the conditions of a frequency range of interest, e.g., the desired signal level, whether jammers are present, the jammer level, the total jammer power relative to the full scale of the ADC, and so on. In most systems, jammers are present for only a small fraction of the time and rarely reach the +58 or +71 dB level specified by IS-98D. Furthermore, the CDMA signals may be received at high signal levels in many instances. The AMC modem can receive multiple CDMA signals under favorable operating conditions.

Figure 2B:
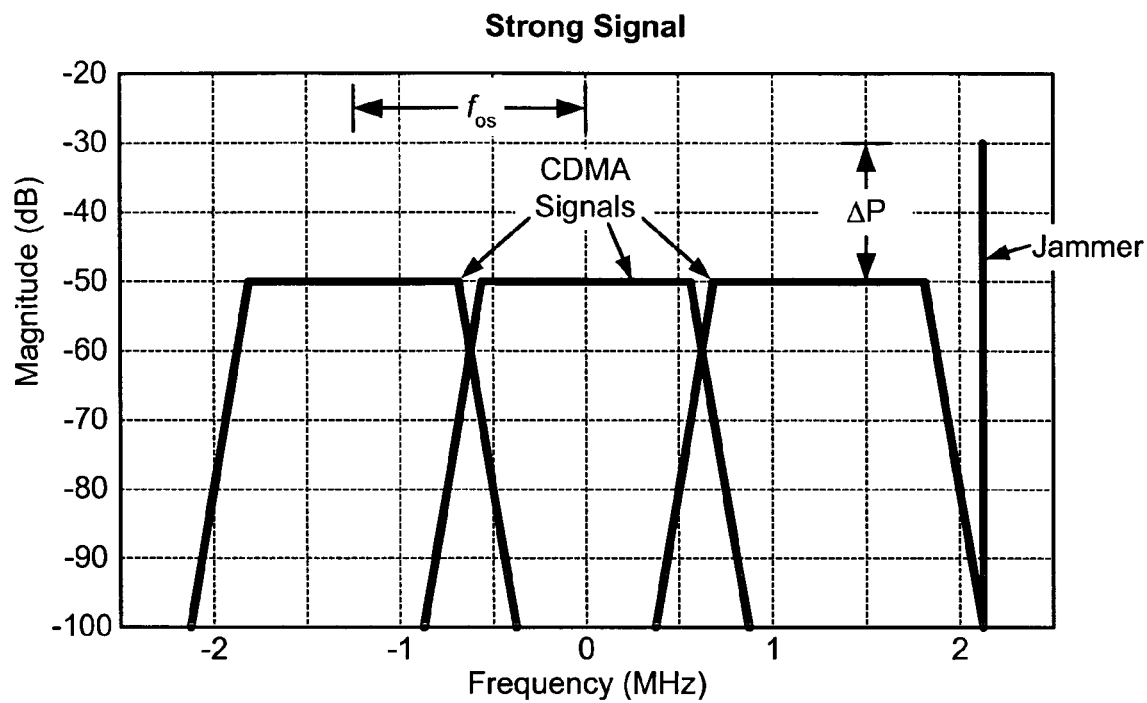
FIG. 2B shows a scenario with strong CDMA signals and a large jammer.

FIG. 2B shows an operating scenario with strong CDMA signals and a large jammer. In this example, the CDMA signals are at a high signal level (approximately −50 dBm) and the jammer is at the maximum level of −30 dBm. Because of the large CDMA signal level, the jammer-to-signal ratio is relatively small ($\Delta P \approx 20$ dB) even though the jammer is at the maximum level.

Figure 2C:
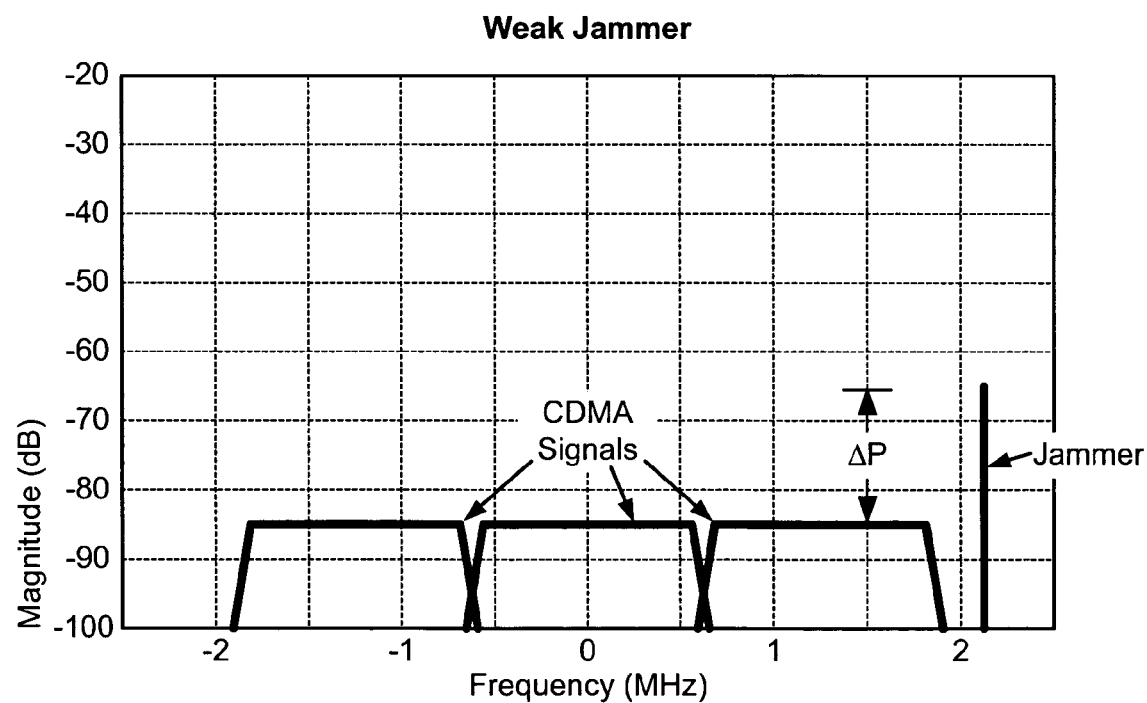
FIG. 2C shows a scenario with weak CDMA signals and a weak jammer.

FIG. 2C shows an operating scenario with weak CDMA signals and a weak jammer. In this example, the CDMA signals are at a low signal level (approximately −85 dBm) and the jammer is also at a low level (approximately −65 dBm). The jammer-to-signal ratio is relatively small ($\Delta P \approx 20$ dB) even though the CDMA signal level is low.

As shown in FIGS. 2B and 2C, a small jammer-to-signal ratio can occur if the CDMA signals are relatively strong (FIG. 2B) or the jammer is relatively weak (FIG. 2C). When the jammer-to-signal ratio is small, the required analog filtering is relaxed or may even be omitted.

Figure 3:
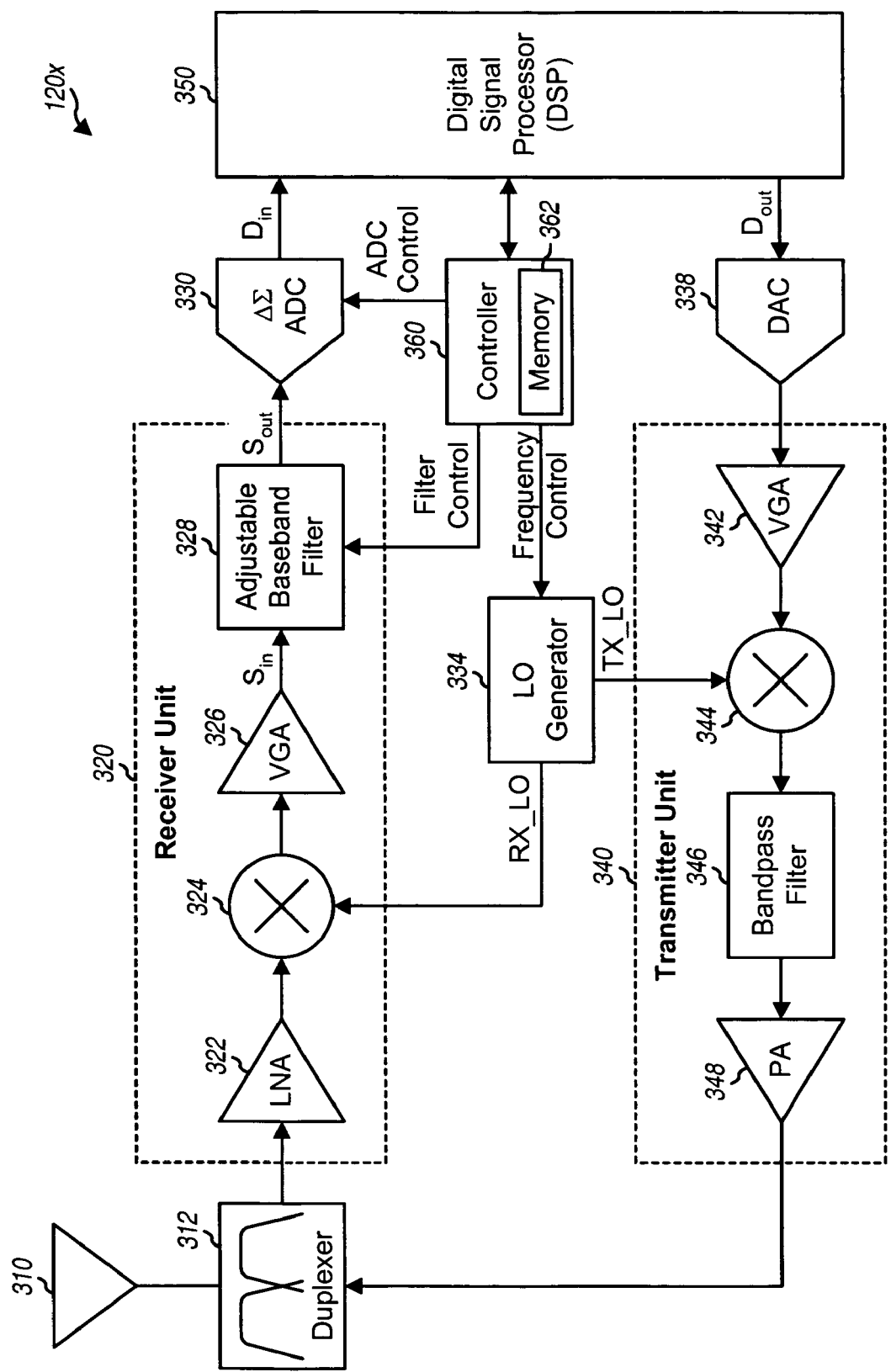
FIG. 3 shows a block diagram of a wireless device with an AMC modem.

FIG. 3 shows a block diagram of a wireless device 120x with an AMC modem. On the receive path, an antenna 310 receives CDMA signals from one or more base stations and possibly interfering signals from other transmitters and provides a received RF signal to a duplexer 312. Duplexer 312 filters the received RF signal for the desired forward link frequency band and provides an input RF signal to a receiver unit 320.

A receiver may implement a super-heterodyne architecture or a direct-to-baseband architecture. In the super-heterodyne architecture, the input RF signal is frequency downconverted in multiple stages, e.g., from RF to an intermediate frequency (IF) in one stage, and then from IF to baseband in another stage. In the direct-to-baseband architecture, the input RF signal is frequency downconverted from RF directly to baseband in one stage. The super-heterodyne and direct-to-baseband architectures may use different circuit blocks and/or have different circuit requirements. The following description is for the direct-to-baseband architecture.

Within receiver unit 320, a low noise amplifier (LNA) 322 receives and amplifies the input RF signal with a fixed or variable gain and provides an amplified RF signal. A mixer 324 frequency downconverts the amplified RF signal with a receive local oscillator (RX_LO) signal from an LO generator 334 and provides a downconverted signal. The frequency of the RX_LO signal is selected such that the desired CDMA signals are downconverted to baseband or near-baseband. A variable gain amplifier (VGA) 326 amplifies the downconverted signal with a variable gain and provides an input baseband signal $S_{in}$ having the desired amplitude. LNA 322, VGA 326, and other circuit blocks in a digital signal processor (DSP) 350 provide the required signal amplification for the input RF signal, which may vary by 90 dB or more in amplitude.

An adjustable baseband filter 328 filters the input baseband signal $S_{in}$ with an adjustable bandwidth and provides an output baseband signal $S_{out}$. A $\Delta\Sigma$ ADC 330 digitizes the output baseband signal and provides data samples $D_{in}$ to DSP 350. Filter 328, ADC 330, and DSP 350 are described in further detail below. Although not shown in FIG. 3 for simplicity, the signals from LO generator 334, mixer 324, VGA 326, filter 328, and ADC 330 are complex signals, with each complex signal having an inphase (I) component and a quadrature (Q) component.

On the transmit path, DSP 350 processes output data $D_{out}$ to be transmitted and provides a stream of data chips to a digital-to-analog converter (DAC) 338. DAC 338 converts the stream of data chips to analog and provides an analog signal to a transmitter unit 340. Within transmitter unit 340, a VGA 342 amplifies the analog signal with a variable gain. A mixer 344 frequency upconverts the amplified signal from baseband to RF with a transmit LO (TX_LO) signal from LO generator 334. A bandpass filter 346 filters the upconverted signal to remove images caused by the digital-to-analog conversion and the frequency upconversion. A power amplifier (PA) 348 amplifies the upconverted signal and provides an output RF signal having the required power level. Duplexer 312 filters the output RF signal for the desired reverse link frequency band and provides a filtered output RF signal to antenna 310 for transmission to a serving base station. Although not shown in FIG. 3 for simplicity, the signals from DSP 350, DAC 338, and VGA 342 are complex signals having inphase and quadrature components.

Duplexer 312 may implement the RF filters for the transmit and receive paths, as shown in FIG. 3. Alternatively or additionally, separate RF filters may be used for the transmit and receive paths. In any case, the RF filter for the receive path typically passes an entire frequency band for the forward link, e.g., from 824 to 849 MHz for the cellular band and from 1850 to 1920 MHz for the PCS band. The RF filter for the transmit power typically passes an entire frequency band for the reverse link, e.g., from 869 to 894 MHz for the cellular band and from 1930 to 1990 MHz for the PCS band. A frequency band covers many CDMA channels, and each CDMA channel has a bandwidth of 1.23 MHz.

DSP 350 performs signal processing on the data samples for the receive path, as described below, and also generates the data chips for the transmit path. A controller 360 controls the operation of DSP 350 and other circuit blocks within wireless device 120x. Controller 360 provides a frequency control that adjusts the frequencies of the RX_LO and TX_LO signals generated by LO generator 334. Controller 360 also provides a filter control that adjusts the bandwidth of adjustable baseband filter 328. Controller 360 also provides an ADC control that sets the sampling rate and/or the reference voltage of ADC 330. The controls for other circuit blocks (e.g., VGAs 326 and 342) are not shown in FIG. 3 for simplicity. Each control may comprise one or multiple control signals. A memory unit 362 stores data and program codes used by controller 360 and may be implemented within controller 360 as shown in FIG. 3 or external to the controller.

FIG. 3 shows a specific design for the receiver and transmitter units. In general, the signal conditioning for each path may be performed by one or more stages of amplifier, filter, mixer, and so on. The receiver and transmitter units may include different and/or additional circuit blocks not shown in FIG. 3.

Figure 4A:
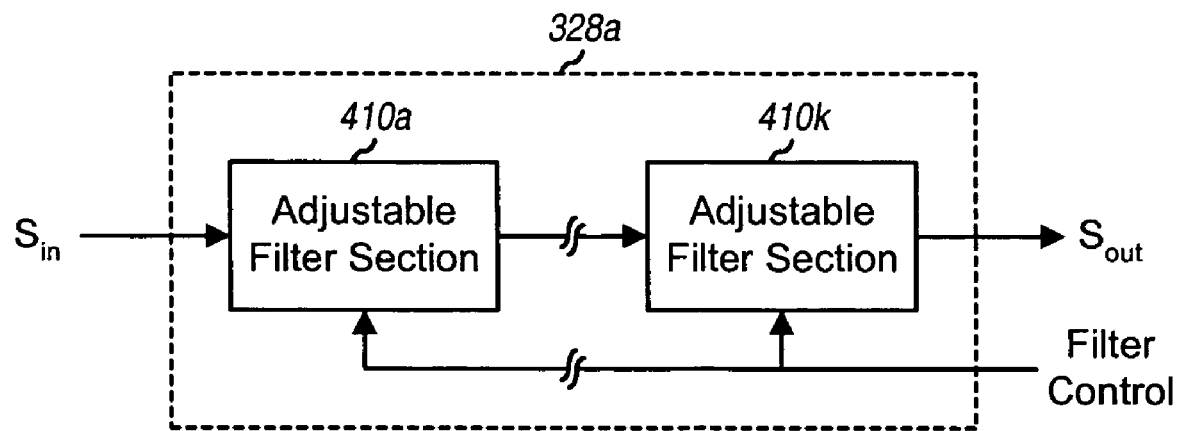
FIGS. 4A and 4B show two embodiments of an adjustable baseband filter.

FIG. 4A shows an adjustable baseband filter 328a, which is an embodiment of filter 328 in FIG. 3. Adjustable baseband filter 328a includes K filter sections 410a through 410k that are coupled in cascade, where K may be any integer one or greater, e.g., K=1, 2, 3, or some other value. The first filter section 410a receives the input baseband signal $S_{in}$ from VGA 326, and the last filter section 410k provides the output baseband signal $S_{out}$ to ADC 330. Each filter section 410 has a particular nominal frequency response, e.g., a nominal bandwidth and filter shape. The K filter sections 410a through 410k may have the same or different nominal frequency responses. At least one filter section has an adjustable bandwidth. The bandwidth of each adjustable filter section may be varied based on a control signal for that filter section. The overall bandwidth of filter 328a may be varied by adjusting the adjustable filter section(s), by enabling certain filter sections and bypassing other filter sections, and so on.

In one embodiment, all K filter sections 410a through 410k have the same nominal bandwidth and are adjustable. Different bandwidths (e.g., for one, two, three or more CDMA signals) may be obtained for filter 328a by adjusting all K filter sections. Each filter section 410 may be a single-pole filter having one dominant pole. The dominant pole may be formed with a resistor and a capacitor, and the bandwidth of the single-pole filter section may be varied by changing the capacitor and/or the resistor.

Figure 4B:
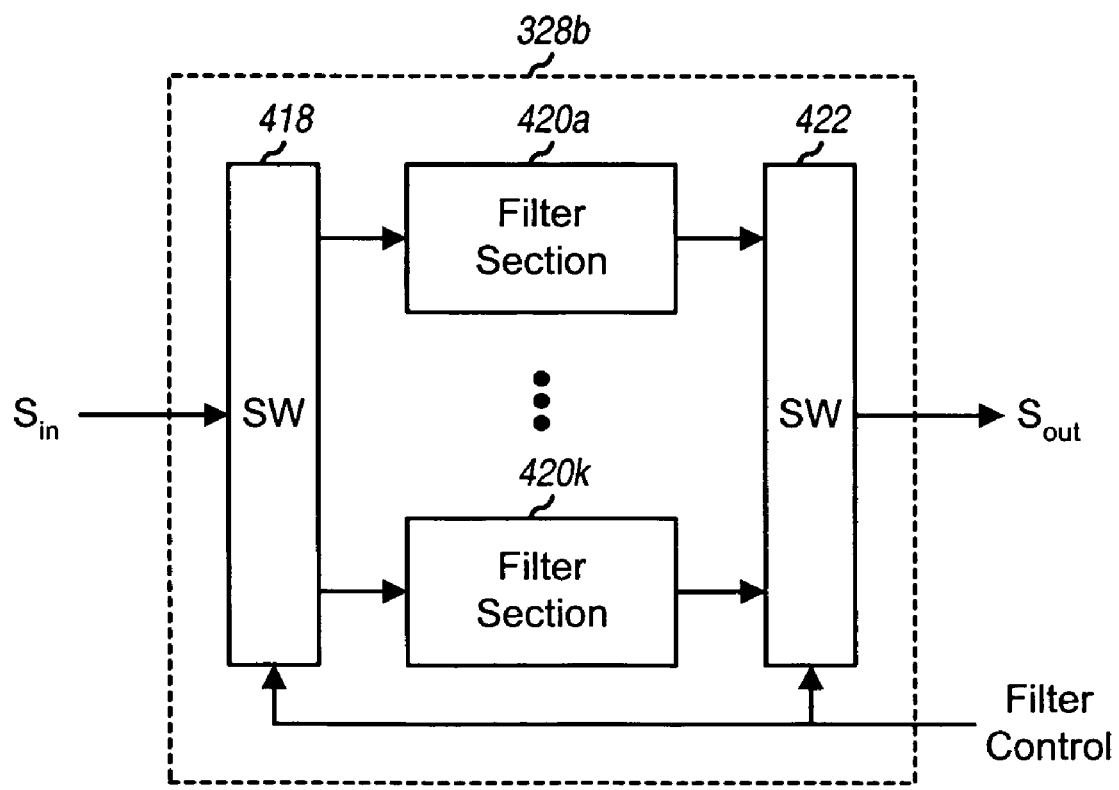

FIG. 4B shows an adjustable baseband filter 328b, which is another embodiment of filter 328 in FIG. 3. Adjustable baseband filter 328b includes K filter sections 420a through 420k, where K may be any integer greater than one. The K filter sections 420a through 420k have different bandwidths. For example, filter section 420a may have a bandwidth for one CDMA signal, filter section 420b may have a bandwidth for two CDMA signals, filter section 420c may have a bandwidth for three CDMA signals, and so on. The overall bandwidth of filter 328b may be varied by selecting different filter sections. A switch 418 receives the input baseband signal $S_{in}$ from VGA 326 and provides this signal to one of the K filter sections, as determined by the filter control. A switch 422 receives an output signal from the selected filter section and provides this signal as the output baseband signal $S_{out}$.

For both adjustable baseband filters 328a and 328b, each filter section may be implemented with various filter types (e.g., Butterworth, elliptical, Chebychev, and so on), with the proper filter order and bandwidth, and with sufficient bias current to meet linearity and dynamic range requirements. One or more filter sections with high selectivity (or a sharp roll-off) may be used to attenuate a large amplitude jammer in the received signal, e.g., for the single-tone test shown in FIG. 2A. In general, the complexity of adjustable baseband filter 328 is dependent on desired operating environments for the AMC modem. Filter 328 provides some filtering of jammers in the received signal so that these jammers do not take up a large portion of the dynamic range of ADC 330. Filter 328 may be designed with higher selectivity in order to operate in environments with a high jammer-to-signal ratio, to receive more CDMA signals simultaneously, and so on.

In an embodiment, filter 328 is implemented as a single-pole adjustable filter that can receive multiple CDMA signals in environments with strong signals or weak jammers. The bandwidth of the filter is determined by the number of CDMA signals being received and is adjusted by moving the location of the dominant pole. This dominant pole may be placed close to or inside the outermost CDMA signal being received. The pole location does not need to be precise and may be moved easily by varying a capacitor, a resistor, and/or some other circuit elements. When the filter bandwidth is varied, the pole location can be ascertained, and the frequency response (e.g., droop) of the filter can be accurately compensated by a digital filter within DSP 350. In another embodiment, filter 328 is implemented with a few adjustable poles. In general, a simple adjustable baseband filter may provide good performance for the AMC modem in many operating environments and may further allow for more accurate compensation of the filter frequency response. The dynamic range of ADC 330 and the filtering by the digital filter within DSP 350 may be relied upon to handle the large signal and weak jammer scenarios shown in FIGS. 2B and 2C.

Figure 5:
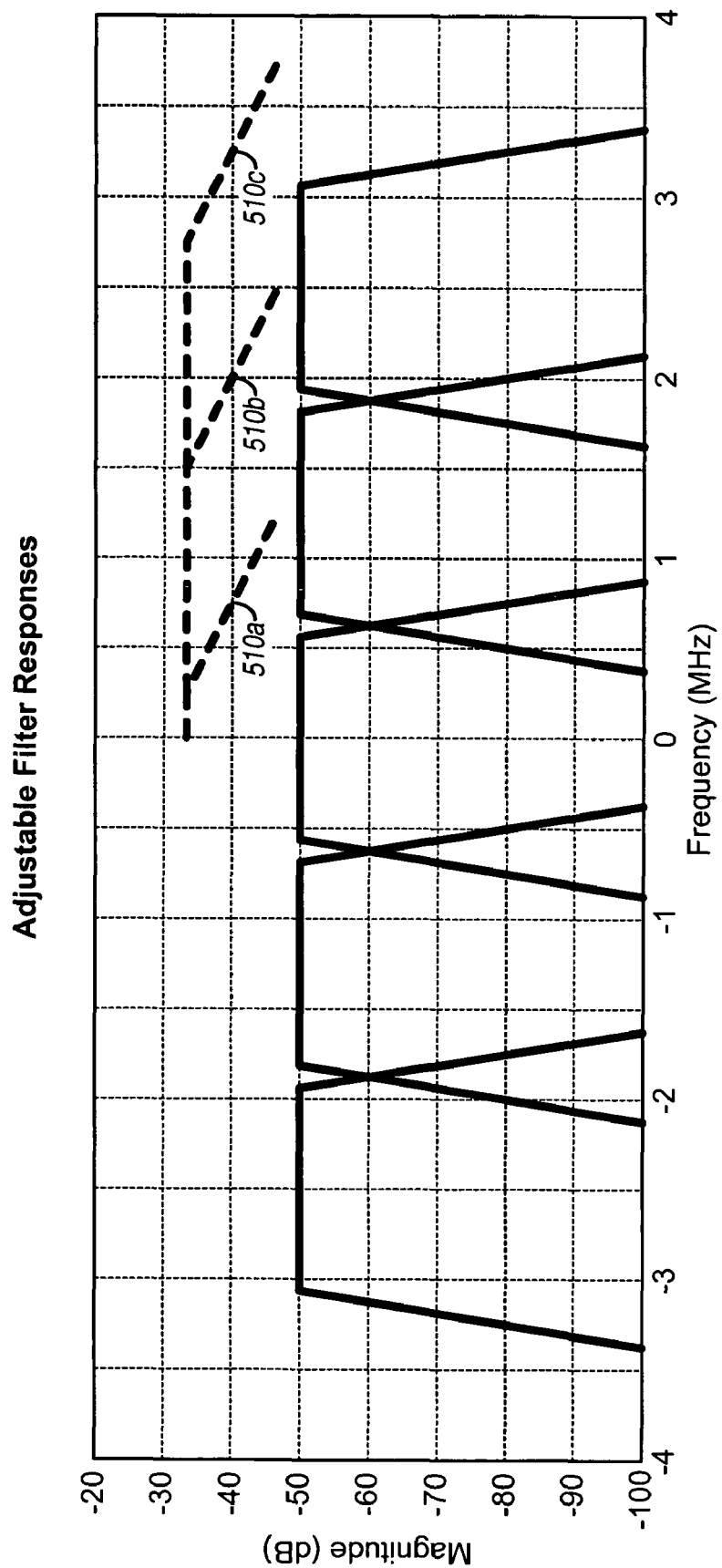
FIG. 5 shows the variable bandwidth of the adjustable baseband filter.

FIG. 5 shows the variable bandwidth of adjustable baseband filter 328 for different numbers of CDMA signals. The center CDMA signal among all of the CDMA signals to be received may be frequency downconverted to DC by mixer 324 in the receive path. The bandwidth of filter 328 may be adjusted to pass all CDMA signals up to and including the outermost CDMA signals being received. For example, filter 328 may have a one-sided frequency response 510a if one CDMA signal is being received, frequency response 510b if three CDMA signals are being received, and frequency response 510c if five CDMA signals are being received.

ADC 330 performs analog-to-digital conversion for the receive path and may be a $\Delta\Sigma$ ADC as shown in FIG. 3 or some other type of ADC (e.g., a flash ADC) having the required dynamic range. A $\Delta\Sigma$ ADC performs analog-to-digital conversion of an input signal by making successive L-bit approximations of the change in amplitude of the input signal, since the previous sample has already been approximated, at a sampling rate that is many times higher than the bandwidth of the input signal. L is typically one but may also be more than one. The data samples from the $\Delta\Sigma$ ADC comprise the input signal and quantization noise. The $\Delta\Sigma$ ADC has certain desirable characteristics, such as high dynamic range and noise shaping, which are well suited for the AMC modem.

Figure 6A:
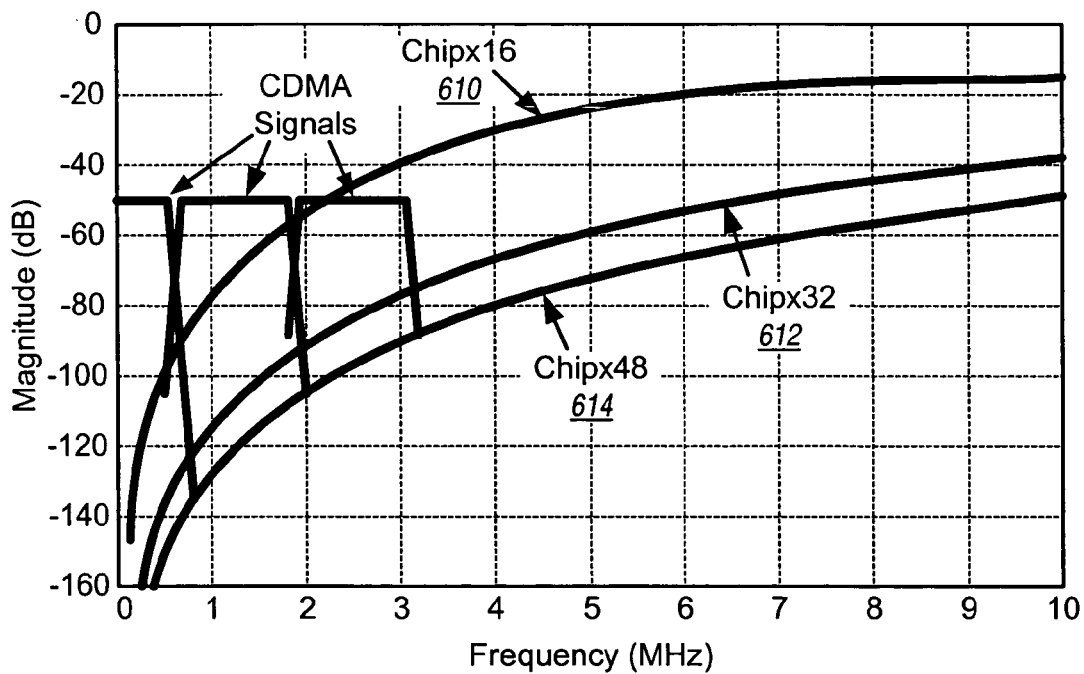
FIGS. 6A and 6B show plots of the noise spectrums of a $\Delta\Sigma$ ADC for different sampling rates and different reference voltages, respectively.

FIG. 6A shows plots of the CDMA signals and plots of the noise spectrums of $\Delta\Sigma$ ADC 330 for different sampling rates. The $\Delta\Sigma$ ADC spectrally shapes the quantization noise such that the noise is pushed from low frequencies toward higher frequencies. This noise shaping allows the CDMA signals to observe less quantization noise inband and hence achieve a higher signal-to-noise ratio (SNR). The out-of-band quantization noise may be more easily filtered by a subsequent digital filter.

The noise spectrum of the $\Delta\Sigma$ ADC is determined by an oversampling ratio (OSR), which is the ratio of the sampling rate of the $\Delta\Sigma$ ADC to the two-sided bandwidth of the desired signal being digitized. The $\Delta\Sigma$ ADC has a specific noise response that is determined by the design of the $\Delta\Sigma$ ADC, e.g., by the number of loops in the $\Delta\Sigma$ ADC, the order of each loop, and so on. This noise response is scaled in frequency by the oversampling ratio. For example, noise spectrum 610 is obtained with a sampling rate that is 16 times the CDMA signal bandwidth (or Chipx16), noise spectrum 612 is obtained with a Chipx32 sampling rate, and noise spectrum 614 is obtained with a Chipx48 sampling rate. The chip rate is 1.23 MHz for cdma2000. For a given CDMA signal level, increasing the sampling rate stretches the noise response in frequency, which effectively increases the bandwidth of the $\Delta\Sigma$ ADC.

The sampling rate of the $\Delta\Sigma$ ADC may be varied based on various factors such as, for example, the number of CDMA signals being received, the operating conditions (e.g., the CDMA signal level and jammer level), power consumption consideration, and so on. A higher sampling rate pushes the quantization noise higher in frequency and increases the bandwidth of the $\Delta\Sigma$ ADC but also results in higher power consumption. A lower sampling rate (e.g., Chipx16) may be used to receive one CDMA signal and a higher sampling rate (e.g., Chipx32 or Chipx48) may be used to receive multiple CDMA signals.

The SNR of the $\Delta\Sigma$ ADC is related to the sampling rate. A higher sampling rate corresponds to a higher SNR since the quantization noise is pushed up in frequency. A lower sampling rate may be used for a high CDMA signal level since the quantization noise is low relative to the signal level. Conversely, a higher sampling rate may be used for a low CDMA signal level to push out quantization noise and achieve a higher SNR.

The $\Delta\Sigma$ ADC uses a reference voltage, Vref, for making approximations of the change in the input signal amplitude. This Vref voltage determines the maximum signal level that can be captured by the $\Delta\Sigma$ ADC without clipping, which is often called the full-scale level. The Vref voltage also determines the quantization noise, which is typically given relative to the Vref voltage. The Vref voltage is normally fixed at a predetermined voltage or is allowed to vary over a small range of voltages. An automatic gain controller (AGC) loop is often used to vary the gain of one or more circuit blocks prior to the $\Delta\Sigma$ ADC such that the input signal level is a desired percentage of the Vref voltage.

Figure 6B:
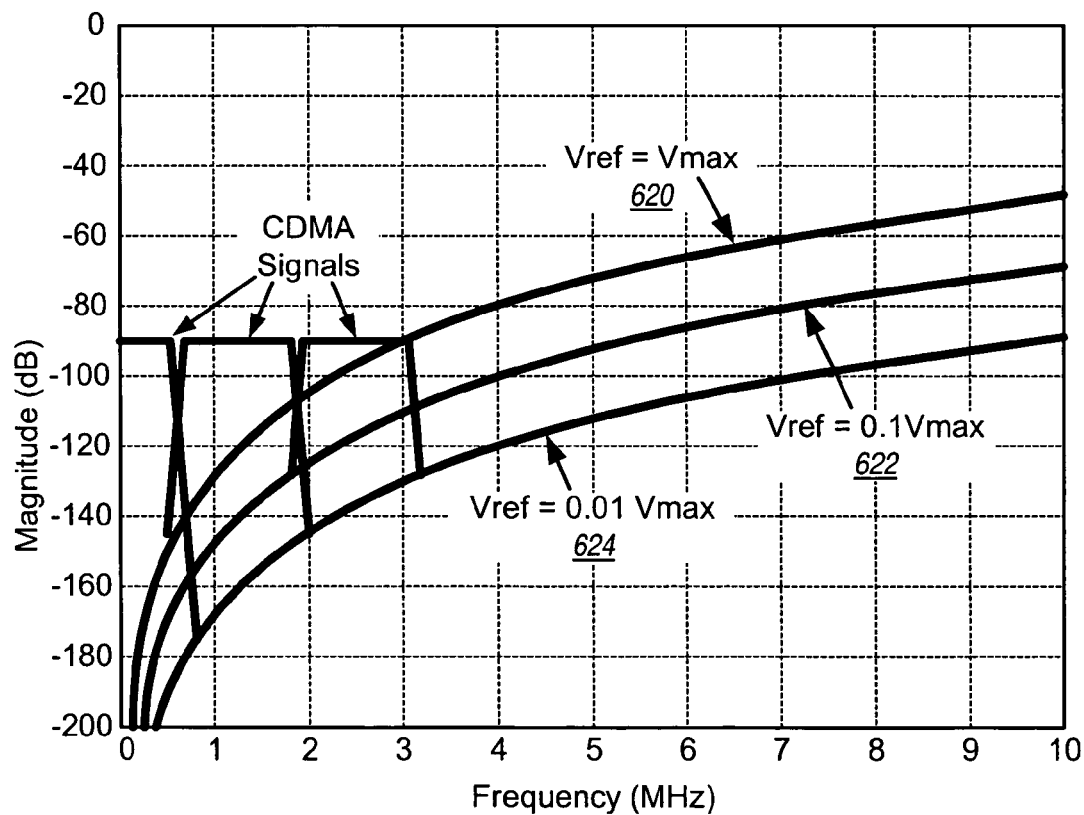

FIG. 6B shows plots of the noise spectrums of the $\Delta\Sigma$ ADC for different Vref voltages with the same sampling rate (e.g., Chipx48). The noise response of the $\Delta\Sigma$ ADC is determined by the design of the $\Delta\Sigma$ ADC. This noise response may be moved up or down by varying the Vref voltage. For example, noise spectrum 620 is obtained with a Vref voltage of Vmax, noise spectrum 622 is obtained with a Vref voltage of 0.1× Vmax, and noise spectrum 624 is obtained with a Vref voltage of 0.01×Vmax. For a given CDMA signal level, moving the quantization noise floor lower via adjustment of the Vref voltage effectively increases the bandwidth of the $\Delta\Sigma$ ADC.

The Vref voltage of the $\Delta\Sigma$ ADC may be varied based on various factors such as, for example, the number of CDMA signals being received, the CDMA signal level, the jammer level, and so on. For example, the Vref voltage may be reduced when receiving multiple CDMA signals, when the CDMA signal level is low, and so on. The lower Vref voltage lowers the quantization noise level and improves SNR for the scenarios described above. Although not shown in FIG. 6B for simplicity, the noise floor of the $\Delta\Sigma$ ADC comes into play and becomes the limiting factor as the quantization noise level is dropped. The Vref voltage may also be used for AGC as described below.

As shown in FIGS. 6A and 6B, a wider bandwidth may be achieved for the $\Delta\Sigma$ ADC by increasing the sampling rate and/or lowering the Vref voltage. The wider bandwidth can accommodate reception of multiple CDMA signals simultaneously. A higher sampling rate also moves the alias frequency higher, which may ease the requirements for the preceding analog baseband filter 328. The alias frequency is half of the sampling rate, and signal components higher than the alias frequency may fold inband when sampled by the ADC.

Table 1 lists some settings for the ΔΣ ADC and possible operating conditions for each setting. A more detailed table containing specific sampling rates and Vref voltages for different operating conditions may be determined based on computer simulation, empirical measurements, and so on.

TABLE 1

| ΔΣ ADC Setting | Conditions |
| --- | --- |
| Low Sampling Rate | One or few CDMA signals, high CDMA signal level. |
| High Sampling Rate | Multiple CDMA signals, low CDMA signal level. |
| Low Vref Voltage | One or few CDMA signals, low signal level and low jammer level. |
| High Vref Voltage | Multiple CDMA signals, high signal level or high jammer level, input RF signal near sensitivity. |

The noise shaping by the ΔΣ ADC results in the CDMA signal at DC achieving the best SNR and the outermost CDMA signal achieving a lower SNR. The ΔΣ ADC may be operated such that the quantization noise is not a dominant factor for any of the CDMA signals being received, e.g., by adjusting the sampling rate and/or the Vref voltage.

Figure 7:
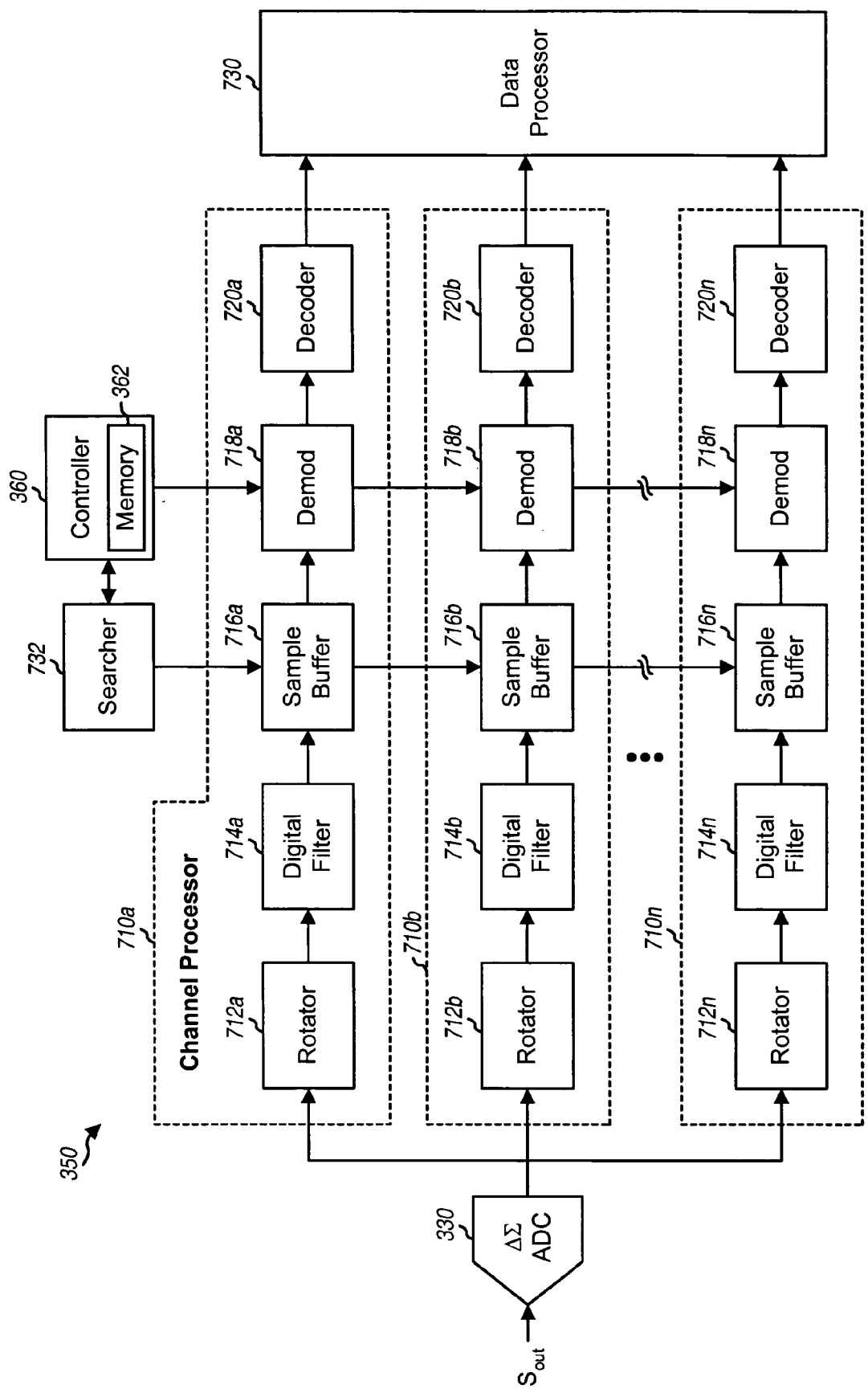
FIG. 7 shows a block diagram of a digital signal processor.

FIG. 7 shows a block diagram of an embodiment of DSP 350 in FIG. 3. For this embodiment, DSP 350 includes N channel processors 710a through 710n, a data processor 730, and a searcher 732. The N channel processors may be implemented with separate hardware or by a common high-speed processor that can perform the processing for all N channel processors in a time division multiplexed (TDM) manner. Each channel processor 710 may be assigned to process one CDMA signal. The data samples from ΔΣ ADC 330 contain all of the CDMA signals being received and are provided to all assigned channel processors 710.

Within each channel processor 710, a rotator 712 performs rotation on the data samples from ΔΣ ADC 330 to translate the center frequency of the assigned CDMA signal from an offset frequency of $f_{os}$ down to DC. As shown in FIG. 5, when receiving multiple CDMA signals, at most one CDMA signal is at DC and each of the remaining CDMA signals is at an offset frequency that is near DC. Rotator 712 multiplies the data samples with a complex sinusoidal signal and provides baseband samples. The sinusoidal signal has a frequency that matches the offset frequency of the assigned CDMA signal. The rotation may be simplified if the offset frequency and the ADC sampling rate are related by an integer multiple.

A digital filter 714 filters the baseband samples from rotator 712 to remove the other CDMA signals and out-of-band undesired signals. Filter 714 further compensates for the frequency response of adjustable baseband filter 328. Filter 714 provides filtered samples, which may be stored in a sample buffer 716 to allow for off-line processing. If the filtered samples are processed in real-time, then sample buffer 716 is not needed.

A demodulator (Demod) 718 processes the stored samples from buffer 716 and provides symbol estimates. For IS-95 and cdma2000, the processing by demodulator 718 includes (1) despreading the samples with a pseudo-random number (PN) sequence used to spectrally spread the data at the base station, (2) decovering the despread samples with data and pilot Walsh codes to obtain data symbols and pilot symbols, (3) filtering the pilot symbols to obtain pilot estimates, and (4) coherently demodulating the data symbols with the pilot estimates to obtain demodulated symbols. Demodulator 718 may implement a rake receiver having multiple finger processors (or simply, fingers) that can process multiple signal instances (or multipaths) of the assigned CDMA signal. In this case, demodulator 718 combines the demodulated symbols from all fingers that have been assigned to process multipaths and provides the symbol estimates for the assigned CDMA signal. Decoder 720 deinterleaves and decodes the symbol estimates and provides decoded data for the assigned CDMA signal.

Searcher 732 searches for strong multipaths in the CDMA signals being processed and provides to controller 360 an indication of the strength and timing of each multipath found by the searcher. The search for multipaths is typically performed based on the pilot sent in each CDMA signal. To search for strong multipaths in a particular CDMA signal, searcher 732 correlates the stored samples for that CDMA signal with a locally generated PN sequence at different PN phases. Due to the pseudo-random nature of the PN sequence, the correlation of the stored samples with the PN sequence should be low except when the phase of the locally generated PN sequence is aligned with the PN phase of a multipath. Controller 360 identifies multipaths of interest based on the information provided by searcher 732 and assigns a finger within demodulator 718 to process each multipath of interest.

Multiple channel processors 710 may be assigned to process multiple CDMA signals simultaneously. The base station may transmit different CDMA signals for different services (e.g., voice, packet data, media broadcast, and so on) on different CDMA channels and may transmit multiple CDMA signals for a popular service (e.g., voice) on multiple CDMA channels. The wireless device identifies CDMA signals being sent for the desired services and selects CDMA signals that are adjacent or close to one another in frequency. The center frequency of the cluster of selected CDMA signals may be downconverted to DC, and one channel processor 710 may be assigned to process each selected CDMA signal. Although the selected CDMA signals are typically on adjacent CDMA channels, this is not a requirement and the CDMA signals do not need to be adjacent to one another in frequency.

Since the multiple CDMA signals are from the same base station and are close to each other in frequency, these CDMA signals may experience similar channel effects such as shadowing and possibly multipath fading. The correlation between the CDMA channels may be exploited to improve performance. For example, searcher 732 may use the location of a strong multipath for one CDMA signal as a starting point in the search for strong multipaths in another CDMA signal. The correlation among the CDMA channels may be used to predict multipaths and hence improve searching.

The timing and frequency information obtained for multiple CDMA signals may be used to improve timing and frequency tracking, respectively. For example, a coarse frequency control loop may be used to account for Doppler, drift in LO generator 334 in FIG. 3, and so on. This coarse frequency control loop may be updated based on frequency information obtained from one, some, or all CDMA signals being received. A fine frequency control loop may be maintained for each assigned CDMA signal and used to track frequency error for that CDMA signal. Similarly, a coarse timing control loop may be used to account for drift in an oscillator that generates clock signals. This coarse timing control loop may be updated based on timing information obtained from one, some, or all CDMA signals being received. A fine timing control loop may be maintained for each assigned CDMA signal and used to track timing error for that CDMA signal.

Since shadowing effects are common across adjacent CDMA channels and fading effects are likely to be somewhat correlated, channel estimation may be performed across these CDMA channels to yield an improved channel estimate for each CDMA channel. In general, knowledge of the correlation among the CDMA channels may be used to improve performance for searching, channel estimation, time and frequency tracking, and so on.

Figure 8:
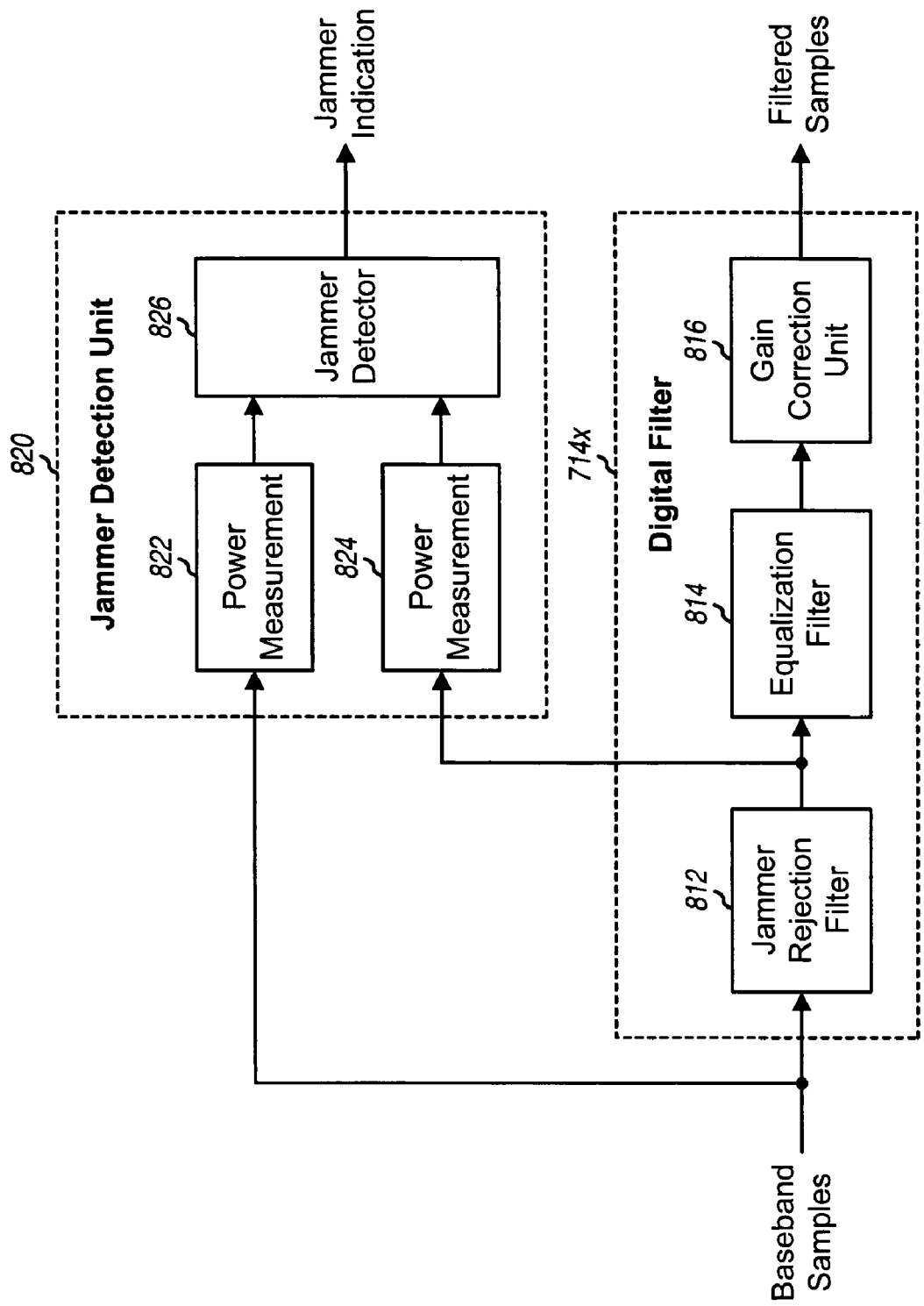
FIG. 8 shows a block diagram of a digital filter and a jammer detector.

FIG. 8 shows an embodiment of a digital filter 714x, which may be used for each of digital filters 714a through 714n in FIG. 7. Within digital filter 714x, a jammer rejection filter 812 filters the baseband samples from rotator 712 with a frequency response having a relatively sharp roll-off to attenuate undesired signals. An equalization filter 814 performs equalization on the output samples from jammer rejection filter 812 to compensate for droops in the passband due to other circuit blocks in the receive path, such as adjustable baseband filter 328 and jammer rejection filter 812. Since baseband filter 328 has more droop at higher frequencies, the equalization may be dependent on the offset frequency $f_{os}$ of the CDMA signal being processed. Equalization filter 814 may provide less compensation if the CDMA signal being processed is centered at DC and more compensation if the CDMA signal is centered at a higher offset frequency.

A gain correction unit 816 scales the samples from equalization filter 814 with an adjustable gain and provides filtered samples having the proper resolution (e.g., four bits/sample) and amplitude and at the proper sample rate (e.g., one or two samples/chip period). Unit 816 can compensate for (1) the signal level of the CDMA signal being processed, (2) adjustment of the sampling rate and/or the Vref voltage of the $\Delta\Sigma$ ADC, (3) the gains of other circuit blocks in the receive path, and so on. Although not shown in FIG. 8, a DC offset removal unit may be used to remove DC offset in the samples for the center CDMA signal that is frequency downconverted to DC by mixer 324.

Filters 812 and 814 may each be implemented with a finite impulse response (FIR) structure, an infinite impulse response (IIR) structure, some other digital filter structure, or a combination thereof. Filters 812 and 814 may each include one or multiple filter sections. For example, filter 812 may be implemented with three bi-quad FIR filter sections, and filter 814 may be implemented with two bi-quad IIR filter sections and a bi-quad FIR filter section, as described in U.S. Pat. No. 6,389,069. The coefficients for filters 812 and 814 may be fixed or programmable to provide flexibility. Digital filter 714x may also include different and/or additional filters, other circuit blocks, and so on.

FIG. 8 also shows an embodiment of a jammer detection unit 820, which may be a part of digital filter 714x or may reside within controller 360. For this embodiment, a power measurement unit 822 receives the baseband samples provided to jammer rejection filter 812, measures the power of these samples, and provides a first power measurement to a jammer detector 826. A power measurement unit 824 receives the samples provided by jammer rejection filter 812, measures the power of these samples, and provides a second power measurement to jammer detector 826. Jammer detector 826 detects for the presence of jammers near the CDMA signal and provides a jammer indication. The first power measurement includes both the desired CDMA signal and out-of-band undesired signals such as jammers. The second power measurement includes mainly the desired CDMA signal since most of the undesired signals are filtered by jammer rejection filter 812. The ratio of the two power measurements is indicative of the undesired signal level relative to the desired signal level. If the difference between the first and second power measurements is large, which indicates that the out-of-band power is large, then jammer detector 826 indicates the presence of large amplitude jammers. Conversely, if the difference between the first and second power measurements is small, which indicates that the out-of-band power is negligible, then jammer detector 826 indicates the absence of large amplitude jammers. The jammer-to-signal ratio is related to, and may be estimated based on, the difference between the first and second power measurements. The jammer indication is provided to controller 360 and used to determine the maximum number of CDMA signals that may be received simultaneously and for other purposes.

In general, jammers may be detected based on two measurements—one measurement prior to a jammer rejection filter and another measurement after the jammer rejection filter. One of the measurements may be implicit. For example, the output of the jammer rejection filter may be set to a predetermined value by an AGC loop, in which case the second power measurement is fixed. The jammer detection may be performed in the digital domain if the jammer filtering is performed in the digital domain, as shown in FIG. 8.

A saturation detector may be used in place of, or in addition to, a jammer detector to detect for saturation by the $\Delta\Sigma$ ADC. Large undesired signals can cause the $\Delta\Sigma$ ADC to saturate, which then causes distortion and other artifacts in the data samples provided by the $\Delta\Sigma$ ADC. The saturation detector may count the number of occurrences of each of the possible ADC values and may declare saturation if the number of occurrences of large ADC values exceeds a predetermined threshold. For example, if the $\Delta\Sigma$ ADC provides 2-bit data samples having values of $\{+3, +1, -1, -3\}$, then the saturation detector may count the number of occurrences of +3 and the number of occurrences of −3 within a predetermined time window and may declare saturation if the number of occurrences of +3 and −3 exceeds the predetermined threshold. The amplitude of the baseband signal provided to the $\Delta\Sigma$ ADC and/or the number of CDMA signals to receive may be decreased if saturation is detected.

Jammer and saturation detection in the digital domain can provide certain advantages such as greater accuracy and flexibility (since the processing is done digitally) and lower cost (since analog circuitry is not needed). In an embodiment, the data samples from the $\Delta\Sigma$ ADC may be transformed to the frequency domain. The frequency spectrum of the data samples may be analyzed to determine whether the $\Delta\Sigma$ ADC may saturate if multiple CDMA signals are received.

Referring back to FIG. 3, the transmit path can handle one or multiple CDMA signals without significantly changing its manner of operation. The circuit blocks in the transmit path may be designed to provide the required linearity for the maximum number of CDMA signals supported by the AMC modem. Power amplifier 348 may be adjusted to provide the required output power level for each CDMA signal. For example, if the required output power level for one CDMA signal is +24 dBm, and three CDMA signals are being transmitted simultaneously, then the total output power level for all three CDMA signals may be set at approximately 5 dB higher, where $10 \cdot \log_{10}(3) = 4.8$ dB.

The receive path is typically required to handle a wide range of input RF signal levels, e.g., 90 dB or more for cdma2000. The circuit blocks in the receive path (e.g., LNA 322, mixer 324, and VGA 326) are designed to have the required linearity over the full range of input RF signal levels. The gain and/or bias current of each variable circuit block in the receive path may be varied based on the input RF signal level. The circuit blocks in the receive path may be operated in the normal manner as if only one CDMA signal is being received. The ΔΣ ADC may be operated to provide coverage for multiple CDMA signals over most of the full range of input RF signal levels.

An AGC loop is maintained for the receive path to ensure that the baseband signal provided to the ΔΣ ADC has the proper amplitude and does not saturate the ΔΣ ADC. The circuit blocks in the receive path may be designed with multiple gain states. Each gain state provides sufficient gain for a specific range of input RF signal levels. The first gain state has the most gain and is designed for the lowest range of input RF signal levels that covers sensitivity. The receive path operates in one of the gain states, which is determined by the input RF signal level.

The Vref voltage for the ΔΣ ADC may be used for AGC. A high Vref may be used for the first gain state since (1) the noise floor is higher due to the large gain in the receive path and (2) a low Vref would diminish the dynamic range of the ADC. For the other gain states, Vref may be used as a form of AGC and may be varied such that the full scale of the ΔΣ ADC matches the CDMA signal level and jammer level. For example, for each gain state except possibly the first gain state, Vref may be adjusted based on the number of CDMA signals being received, e.g., higher Vref for more CDMA signals and lower Vref for fewer CDMA signals. Vref may also be adjusted to track changes in the input RF signal level. Vref may be (1) reduced for lower input RF signal level without compromising dynamic range if jammers are not present and (2) increased for higher input RF signal level (e.g., due to reception of more CDMA signals) to make use of the available gain in the gain state.

The CDMA signals transmitted by a base station on different CDMA channels in the same frequency band should have similar received signal levels. AGC may be performed on the input RF signal level for all of the CDMA signals being received. A separate AGC loop may be maintained for each CDMA signal being received. Each separate AGC loop adjusts the gain for one CDMA signal (e.g., via gain correction unit 816 in FIG. 8) so that the filtered samples have the proper amplitude.

Channel selection refers to the determination of the number of CDMA signals that may be received simultaneously and the selection of specific CDMA signals for reception. Channel selection may be performed at the start of a call and may also be performed during a call, e.g., based on changes in the operating conditions, user requirements, and so on. The wireless device may receive different numbers of CDMA signals and/or different CDMA signals during a call.

In general, the number of CDMA signals that may be received simultaneously is dependent on various factors such as operating conditions, receiver capabilities, user requirements, and so on. The operating conditions may be ascertained with a jammer detector, a saturation detector, spectral analysis, and so on. The receiver capabilities may be quantified by the selectivity of the adjustable baseband filter, the dynamic range of the ADC, and so on. When the jammer-to-signal ratio is small due to strong CDMA signals or weak jammers, the AMC modem can simultaneously receive multiple CDMA signals. The AMC modem may be operated to receive as many CDMA signals as possible (e.g., 1, 2, 3, 4, 5, and so on) based on the operating conditions. The AMC modem may also be operated to receive a varying number of CDMA signals based on changes in the operating conditions.

The AMC modem may be used in various manners and for various purposes. The AMC modem may receive multiple CDMA signals for different services. For example, the AMC modem may receive one CDMA signal for voice, one or more other CDMA signals for packet data, another CDMA signal for broadcast data and/or paging, and so on. As another example, the AMC modem may receive a first CDMA signal for packet data and a second CDMA signal for paging, which can alleviate the need for the first CDMA signal to carry overhead to support paging. The ability to support multiple uses concurrently will become more important as network operators provide more services and functionality via more CDMA channels.

The AMC modem may also receive multiple CDMA signals in order to increase peak throughput. For example, if the peak data rate is 2.4 Mbps for one CDMA signal, then the AMC modem can achieve 4.8 Mbps with two CDMA signals, 7.2 Mbps with three CDMA signals, 12.0 Mbps with five CDMA signals, and so on. The ability to receive multiple CDMA signals shortens data download time, improves user satisfaction, and enhances resource utilization.

The AMC modem may receive multiple CDMA signals in order to achieve frequency diversity. For example, the base station may randomly transmit packets via more than one CDMA channel, selectively transmit packets on better CDMA channels (e.g., with higher success rates based on ACK feedback), transmit packets on CDMA channels with better received signal quality, and so on. Frequency diversity may enhance performance and may be used in combination with other forms of diversity such as antenna diversity, which is the use of multiple antennas for signal reception.

The base station may or may not need to be aware of the wireless device receiving multiple CDMA signals. For autonomous reception (or open-loop operation), the wireless device determines how many CDMA signals to receive and which CDMA signals to receive, without having to inform the base station. Autonomous reception may be used to receive independently generated CDMA signals, e.g., for different services. For coordinated reception (or closed-loop operation), the wireless device and/or the base station determines how many CDMA signals to receive and which CDMA signals to receive, and the base station is aware of the selected CDMA signals. Coordinated reception may be used to receive multiple services in combination (e.g., voice and video), data from multiple CDMA channels (e.g., for frequency diversity and/or higher data rate), and so on. The base station generates the interdependent CDMA signals accordingly.

Figure 9:
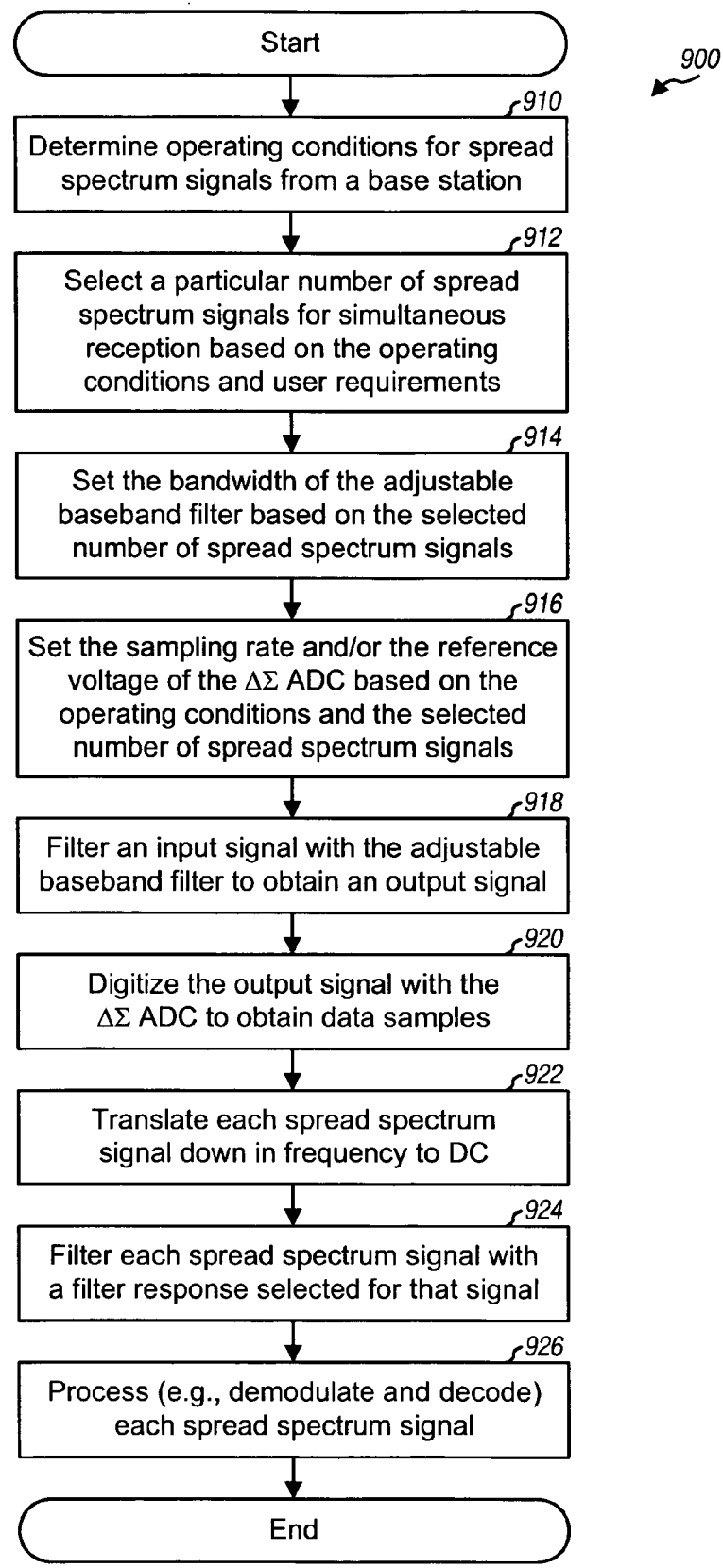
FIG. 9 shows a process to receive signals from a base station.

FIG. 9 shows a process 900 performed by a wireless device to receive signals from a serving base station. Initially, the operating conditions observed by spread spectrum signals transmitted by the serving base station are determined (block 910). The spread spectrum signals may be CDMA signals from a cdma2000 base station, W-CDMA signals from a Universal Mobile Telecommunications System (UMTS) Node B, or some other spread spectrum signals. The operating conditions may be determined by estimating the desired signal level, the jammer level, and so on. A particular number of spread spectrum signals is selected for simultaneous reception based on the operating conditions, the user requirements, and possibly other factors (block 912). The bandwidth of an adjustable filter is set based on the selected number of spread spectrum signals (block 914). The sampling rate and/or the reference voltage for an ADC may be set based on the operating conditions, the selected number of spread spectrum signals, and so on (block 916). An input signal (e.g., from VGA 326 in FIG. 3) is filtered by the adjustable filter to obtain an output signal (block 918). The output signal is digitized by the ADC to obtain data samples (block 920). Each selected spread spectrum signal is translated down in frequency to DC (block 922), filtered with a filter response selected for that spread spectrum signal (block 924), and further processed (e.g., demodulated and decoded) to obtain decoded data for the spread spectrum signal (block 926).

The AMC modem described herein may be implemented by various means. For example, AMC modem may be implemented with hardware or a combination of hardware and software. For a hardware implementation, the processing units used to receive multiple spread spectrum signals may be implemented within one or more application specific integrated circuits (ASICs), digital signal processors (DSPs), digital signal processing devices (DSPDs), programmable logic devices (PLDs), field programmable gate arrays (FPGAs), RF integrated circuits (RFICs), processors, controllers, micro-controllers, microprocessors, electronic devices, other electronic units designed to perform the functions described herein, or a combination thereof.

Certain parts of the AMC modem may be implemented in software. For example, the channel selection and various control functions may be implemented with modules (e.g., procedures, functions, and so on) that perform the functions described herein. The software codes may be stored in a memory unit (e.g., memory unit 362 in FIG. 3) and executed by a processor (e.g., controller 360). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    an adjustable filter operative to filter an input signal with an adjustable bandwidth and to provide an output signal, wherein the adjustable bandwidth is determined based on a selected number of spread spectrum signals, the selected number of spread spectrum signals being selected from a plurality of possible numbers of spread spectrum signals selected for reception;
    a digital processor operative to process samples generated from the output signal for each spread spectrum signal among the selected number of spread spectrum signals; and
    a delta-sigma analog-to-digital converter ($\Delta\Sigma$ ADC) operative to digitize the output signal to generate the samples, wherein the $\Delta\Sigma$ ADC is configured to vary its bandwidth in response to variances in either a sampling rate or a Vref voltage or a combination thereof.

2. The apparatus of claim 1, wherein the adjustable filter comprises at least one filter section having variable bandwidth.

3. The apparatus of claim 1, wherein the adjustable filter comprises a plurality of filter sections having different bandwidths, and wherein one of the plurality of filter sections is selected to filter the input signal.

4. The apparatus of claim 1, further comprising:
    a controller operative to set a sampling rate of the $\Delta\Sigma$ ADC based on the selected number of spread spectrum signals.

5. The apparatus of claim 1, further comprising:
    a controller operative to set a reference voltage of the $\Delta\Sigma$ ADC based on the selected number of spread spectrum signals.

6. The apparatus of claim 1, wherein the digital processor comprises at least one channel processor, each channel processor of the at least one channel processor being operative to process the samples for a respective spread spectrum signal among the selected number of spread spectrum signals.

7. The apparatus of claim 6, wherein said each channel processor comprises a rotator operative to frequency translate the respective spread spectrum signal down to direct current (DC).

8. The apparatus of claim 6, wherein said each channel processor comprises a digital filter operative to perform filtering for jammer rejection.

9. The apparatus of claim 6, wherein said each channel processor comprises a digital filter operative to perform frequency compensation for the respective spread spectrum signal.

10. The apparatus of claim 6, wherein said each channel processor comprises a digital filter operative to perform gain correction for the respective spread spectrum signal.

11. The apparatus of claim 1, further comprising:
    a jammer detection unit operative to detect for jammers near the selected number of spread spectrum signals.

12. The apparatus of claim 11, wherein the jammer detection unit is operative to obtain a first power measurement prior to jammer rejection filtering, to obtain a second power measurement after the jammer rejection filtering, and to detect for jammers based on the first and second power measurements.

13. The apparatus of claim 1, further comprising:
    a controller operative to determine operating conditions and to select the number of spread spectrum signals based on the operating conditions.

14. The apparatus of claim 1, further comprising:
    a controller operative to select the number of spread spectrum signals based on spread spectrum signal level and jammer level.

15. The apparatus of claim 1, wherein the controller is operative to select more than one spread spectrum signal for strong spread spectrum signals and for weak jammers.

16. The apparatus of claim 1, further comprising:
    a controller operative to select the number of spread spectrum signals based on user requirements.

17. An apparatus comprising:
    means for determining operating conditions for a plurality of spread spectrum signals;
    means for selecting a particular number of spread spectrum signals for simultaneous reception based on the operating conditions;
    means for setting a baseband filter bandwidth based on the selected number of spread spectrum signals;
    means for filtering an input signal with the baseband filter bandwidth to obtain an output signal;
    means for processing samples generated from the output signal for each spread spectrum signal among the selected number of spread spectrum signals; and
    a delta-sigma analog-to-digital converter ($\Delta\Sigma$ ADC) operative to digitize the output signal to generate the samples, wherein the $\Delta\Sigma$ ADC is configured to vary its bandwidth in response to variances in either a sampling rate or a Vref voltage or a combination thereof.

18. The apparatus of claim 17, further comprising:
    means for translating each spread spectrum signal among the selected number of spread spectrum signals down in frequency to direct current (DC).

19. The apparatus of claim 17, further comprising:
    means for filtering each spread spectrum signal among the selected number of spread spectrum signals with a filter response selected for the spread spectrum signal.

20. The apparatus of claim 17, further comprising:
means for detecting for jammers near the selected number of spread spectrum signals, and wherein the number of spread spectrum signals is selected based on the detected jammers.

21. A method of receiving data in a wireless communication system, comprising:
determining operating conditions for a plurality of spread spectrum signals;
selecting a particular number of spread spectrum signals for simultaneous reception based on the operating conditions;
setting a filter bandwidth of a baseband filter based on the selected number of spread spectrum signals;
filtering an input signal with the filter bandwidth to obtain an output signal;
processing samples generated from the output signal for each spread spectrum signal among the selected number of spread spectrum signals; and
digitizing the output signal via a delta-sigma analog-to-digital converter ($\Delta\Sigma$ ADC) to generate the samples, wherein the $\Delta\Sigma$ ADC is configured to vary its bandwidth in response to variances in either a sampling rate or a Vref voltage or a combination thereof.

22. The method of claim 21, further comprising:
filtering each spread spectrum signal among the selected number of spread spectrum signals with a filter response selected for the spread spectrum signal.

23. The method of claim 21, further comprising:
detecting for jammers near the selected number of spread spectrum signals, and wherein the number of spread spectrum signals is selected based on the detected jammers.

24. An apparatus comprising:
a delta-sigma analog-to-digital converter ($\Delta\Sigma$ ADC) operative to digitize an input analog signal to generate samples; and
a controller operative to determine operating conditions for at least one spread spectrum signal selected from a plurality of spread spectrum signals, and to select a sampling rate, a reference voltage, or both the sampling rate and the reference voltage for the $\Delta\Sigma$ ADC based on the operating conditions, wherein a bandwidth for the $\Delta\Sigma$ ADC depends upon a sampling rate, the Vref voltage or a combination thereof.

25. The apparatus of claim 24, wherein the controller is operative to select a low sampling rate for a high spread spectrum signal level and to select a high sampling rate for a low spread spectrum signal level.

26. The apparatus of claim 24, wherein the controller is operative to select the sampling rate further based on the number of spread spectrum signals to receive.

27. The apparatus of claim 26, wherein the controller is operative to select a low sampling rate for one spread spectrum signal and to select a high sampling rate for multiple spread spectrum signals.

28. The apparatus of claim 24, wherein the controller is operative to select a low reference voltage for a low spread spectrum signal level and to select a high reference voltage for a high spread spectrum signal level.

29. An apparatus comprising:
a controller operative to select a variable number of spread spectrum signals to receive simultaneously based on operating conditions, user requirements, or a combination thereof, wherein the variable number of spread spectrum signals are selectable during a call, each of the variable number of spread spectrum signals occupying a different frequency band;
a receiver unit operative to process an input signal and provide an output signal comprising the selected variable number of spread spectrum signals; and
a delta-sigma analog-to-digital converter ($\Delta\Sigma$ ADC) operative to digitize the output signal to generate the samples, wherein the $\Delta\Sigma$ ADC is configured to vary its bandwidth in response to variances in either a sampling rate or a Vref voltage or a combination thereof.

30. The apparatus of claim 29, wherein the controller is operative to select more than three spread spectrum signals for strong spread spectrum signals or weak jammers.

31. An apparatus comprising:
a controller operative to select a variable number of spread spectrum signals for at least two services to be received concurrently, each of the selected spread spectrum signals occupying a different frequency band;
a receiver unit operative to process an input signal and provide an output signal comprising the selected spread spectrum signals;
a processor operative to process samples generated from the output signal for each of the selected spread spectrum signals; and
a delta-sigma analog-to-digital converter ($\Delta\Sigma$ ADC) operative to digitize the output signal to generate the samples, wherein the $\Delta\Sigma$ ADC is configured to vary its bandwidth in response to variances in either a sampling rate or a Vref voltage or a combination thereof.

32. The apparatus of claim 31, wherein the controller is operative to select a spread spectrum signal for voice service and to select at least one spread spectrum signal for packet data service.

33. A processing system, comprising:
an input port;
an output port; and
a processor configured to:
determine operating conditions for a plurality of spread spectrum signals;
select a particular number of spread spectrum signals for simultaneous reception based on the operating conditions;
set a filter bandwidth of a baseband filter based on the selected number of spread spectrum signals to enable the processing system to: (1) filter an input signal from the input port with the filter bandwidth to obtain an output signal to output through the output port, and (2) process samples generated from the output signal for each spread spectrum signal among the selected number of spread spectrum signals; and
set a $\Delta\Sigma$ ADC bandwidth by varying either a sampling rate of the $\Delta\Sigma$ ADC or a Vref voltage or a combination thereof.

34. A tangible storage medium having stored thereon processor-executable software instructions configured to cause a processor to perform steps comprising:
determining operating conditions for a plurality of spread spectrum signals;
selecting a particular number of spread spectrum signals for simultaneous reception based on the operating conditions;
setting a filter bandwidth based on the selected number of spread spectrum signals to enable a filtration of an input signal with the filter bandwidth to obtain an output signal;

processing samples generated from the output signal for each spread spectrum signal among the selected number of spread spectrum signals; and digitizing the output signal via a delta-sigma analog-to-digital converter ($\Delta\Sigma$ ADC) to generate the samples, wherein the $\Delta\Sigma$ ADC is configured to vary its bandwidth in response to variances in either a sampling rate or a Vref voltage or a combination thereof.

35. The tangible storage medium of claim 23, wherein the stored processor-executable software instructions are configured to cause a processor to perform further steps comprising: filtering each spread spectrum signal among the selected number of spread spectrum signals with a filter response selected for the spread spectrum signal.

36. The tangible storage medium of claim 34, wherein the stored processor-executable software instructions are configured to cause a processor to perform further steps comprising: detecting for jammers near the selected number of spread spectrum signals, and wherein the number of spread spectrum signals is selected based on the detected jammers.

* * * * *